(No Model.)
2 Sheets—Sheet 1.
E. A. GERRARD.
HAY RAKE AND LOADER.
No. 335,519. Patented Feb. 2, 1886.
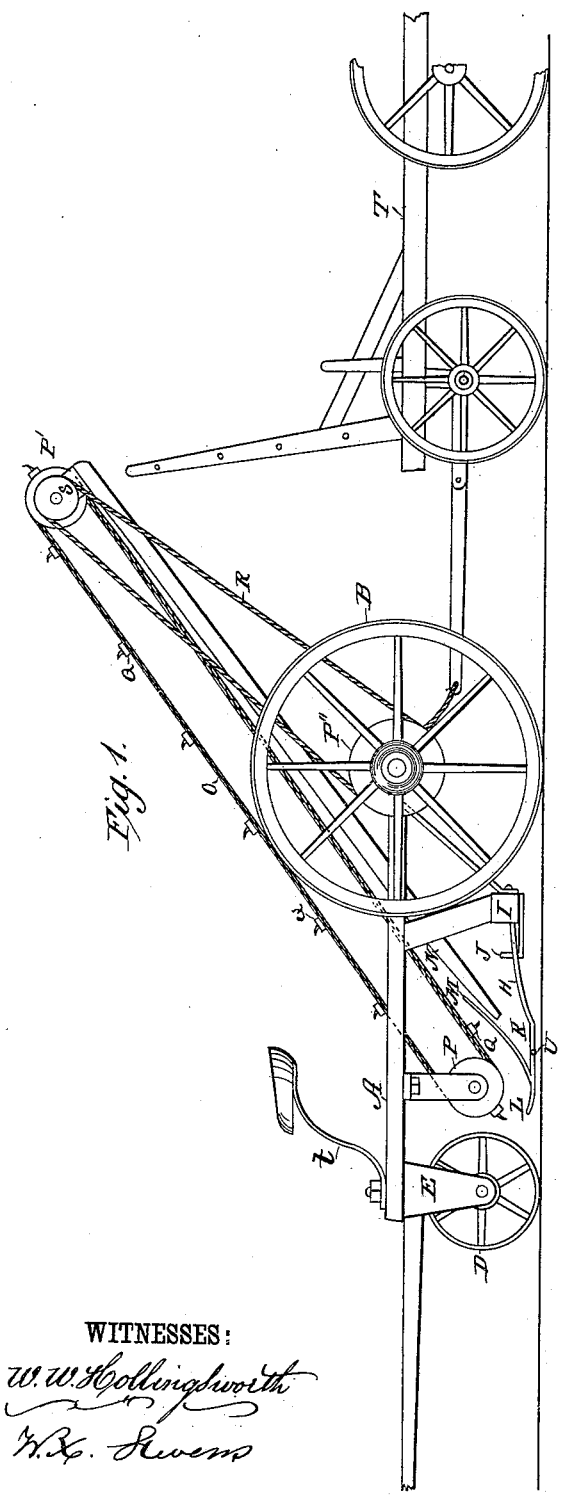
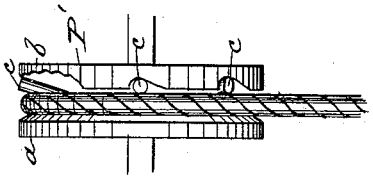
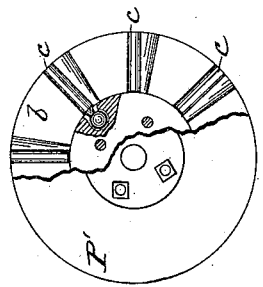
WITNESSES:
W. W. Hollingsworth
W. X. Stevens
INVENTOR:
E. A. Gerrard
BY Munn & Co.
ATTORNEYS.

(No Model.) 2 Sheets—Sheet 2.
E. A. GERRARD.
HAY RAKE AND LOADER.
No. 335,519. Patented Feb. 2, 1886.
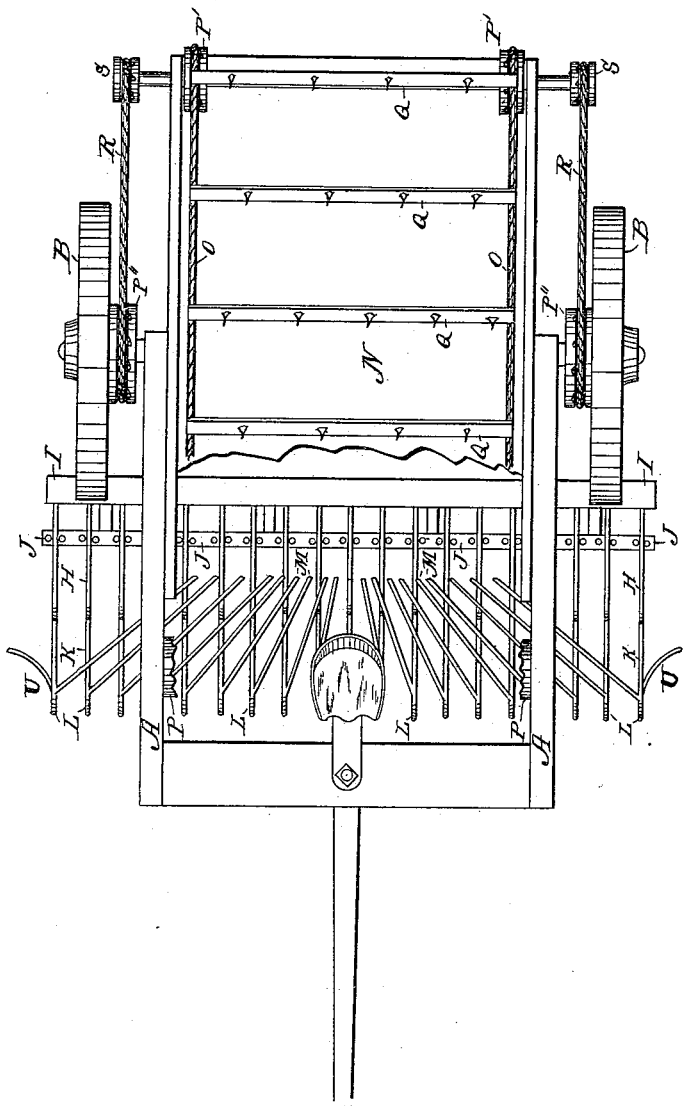
WITNESSES:
W. W. Hollingsworth
W. B. C. Stevens.
INVENTOR:
E. A. Gerrard
BY Munn & Co.
ATTORNEYS.

UNITED STATES PATENT OFFICE.

EDWARD A. GERRARD, OF COLUMBUS, NEBRASKA, ASSIGNOR TO HIMSELF AND CHARLES W. ZEIGLER, OF SAME PLACE.

HAY RAKE AND LOADER.

SPECIFICATION forming part of Letters Patent No. 335,519, dated February 2, 1886.

Application filed September 11, 1884. Serial No. 142,762. (No model.)

*To all whom it may concern:*

Be it known that I, EDWARD A. GERRARD, a citizen of the United States, residing at Columbus, in the county of Platte and State of Nebraska, have invented certain new and useful Improvements in Hay Rakes and Loaders, of which the following is a description.

This invention relates to that class of devices which are mounted on wheels and drawn across fields to rake up hay and to raise the hay up onto an attending wagon; and its object is to provide means whereby the vehicle may be readily turned in a small space, means whereby the hay to be elevated will be separated from the hay to remain on the ground beneath and alongside the machine, means for holding the rake-teeth, and means for running the elevator-rope.

To this end my invention consists in the construction and combination of parts hereinafter described and claimed, reference being had to the accompanying drawings, in which—

Figure 1 is a side elevation of my hay rake and loader, showing a portion of an attendant wagon. Fig. 2 is a plan view of the same, a part of the slideway being broken away. Fig. 3 is a side elevation, part broken away, of an elevator-pulley; and Fig. 4 is an edge view of the same.

A represents the frame of the machine, mounted on a pair of hind wheels, B, and a single central forward wheel, D. This forward wheel is made a caster by mounting on it a turn-plate, E, to turn under the forward end of the frame A. The team-pole is attached to this caster-wheel, so that when the team is turned short the wheel will turn with the pole and will not interfere with the under works of the machine, as would be the case if there were two forward wheels. The rider's seat F is mounted on the forward part of the frame in any usual manner, such as by the spring-brace $t$.

H represents a tooth of the rake, secured at its lower rear end to a cross-bar, I, which is fixed to the frame. The body of the tooth rests in a guide-fork, J, in which it may play vertically; thence it extends forward and downward to slide on the ground at K, and is bent up a little at the toe L, like a sled-runner, to slide over slight obstacles. From the toe or point of the tooth it rises in an easy curve to its upper rear end, M. This rear end, M, is free to vibrate as the tooth rises and falls in running over uneven ground, and it is located above the lower end of the elevator-slideway N, in order that the hay which it rakes up may pass onto the slideway, to be carried up by the elevator. The elevator consists of a pair of endless ropes, O, mounted each on two sheave-pulleys, P P', and cross-bars Q, provided with teeth. The lower pulleys, P, are mere rollers journaled in the frame. The upper pulleys, P', are driving-pulleys, for which purpose they are fixed upon a shaft which is journaled in the frame and provided with a pulley, S, to be revolved by a driving belt or rope, R, from a pulley, P'', on the hub of a hind-wheel, B.

The driving-pulleys are provided with a peculiar clutching device, to engage the elevator-ropes O, as follows: The side $a$ of the groove in the pulley P' may be a plane or conical surface. The side $b$ is provided with radial pockets, in each of which a roller, $c$, is loosely pivoted at the hub, to stand like the spoke of a wheel. The rear face of each pocket slants toward the opposite side, $a$, to serve as a wedge by which the roller may be pressed upon a rope, O, in the groove between the sides $a$ and $b$. When the pulley P' revolves, the rollers $c$ will be successively caught between the rope and the slanting side of the pocket, and the tangential action of the rope on the roller tends to roll it farther out and to the rear on the slant, thus gripping harder on the rope. The heavier the weight which resists the progress of the rope the harder will the roller be caused to grip the rope, and vice versa, so that by this means the force of the grips is directly proportional to the work required of them. The slideway N is narrow enough to be easily carried between the wheels B; but the path cleared by the rake is wider than the wheels. To accomplish this, the cross-bar I extends across ahead of the hind wheels, and the teeth project forward and a little downward into the stubble, in which they lie for a few inches at K, rising at the toes, as described. From the toes the teeth converge as they rise to the rear into the width of the slideway within which is their field of delivery.

T represents an attendant wagon, to receive the hay as it falls from the top of the elevator. It is here shown attached to the rake and elevator; but that is not necessary, for my elevator may be extended far enough to pass over a team in its rear, if it is desirable to have a separate team to haul the wagon.

U represents a separator secured to each outside tooth, to part the hay being gathered from that left on the field beside the machine. The ropes O run so loosely over the pulleys that the cross-bars Q may rest on the inner flanges of the pulleys in passing over. The portion K of the tooth runs in the stubble parallel with the ground for some distance and forms a wedge with the part M, in order that it may hold down into the stubble any loose locks which do not rise on the part M, so as to form a perfect separation and prevent tangling.

What I claim as my invention, and desire to secure by Letters Patent, is—

1. The combination, with an elevator, substantially as described, and a cross-beam below it, of a series of rake-teeth, each having a nearly horizontal portion and a branch extending upward and rearward therefrom, the said branches converging toward a common center, substantially as shown and described.

2. The combination, with an elevator, substantially as described, mounted on wheels, and having the slideway N and the cross-bar I, the former narrower than the latter and narrower than the space between the hind wheels, of the teeth H, extending forward parallel from their points of attachment to the bar I and converging to their field of delivery in the said slideway, as shown and described.

EDWARD A. GERRARD.

Witnesses:
L. GERRARD,
A. J. ARNOLD.